United States Patent
Suwa et al.

(10) Patent No.: US 12,391,168 B2
(45) Date of Patent: Aug. 19, 2025

(54) HEADLIGHT DEVICE

(71) Applicant: Mitsubishi Electric Corporation, Tokyo (JP)

(72) Inventors: Masashige Suwa, Tokyo (JP); Keisuke Igarashi, Tokyo (JP)

(73) Assignee: MITSUBISHI ELECTRIC CORPORATION., Tokyo (JP)

( * ) Notice: Subject to any disclaimer, the term of this patent is extended or adjusted under 35 U.S.C. 154(b) by 120 days.

(21) Appl. No.: 18/288,996

(22) PCT Filed: May 12, 2021

(86) PCT No.: PCT/JP2021/018063
§ 371 (c)(1),
(2) Date: Oct. 31, 2023

(87) PCT Pub. No.: WO2022/239151
PCT Pub. Date: Nov. 17, 2022

(65) Prior Publication Data
US 2024/0239260 A1    Jul. 18, 2024

(51) Int. Cl.
*B60Q 1/04* (2006.01)

(52) U.S. Cl.
CPC .......... *B60Q 1/04* (2013.01); *B60Q 2300/312* (2013.01); *B60Q 2400/20* (2013.01)

(58) Field of Classification Search
CPC . B60Q 1/04; B60Q 2300/312; B60Q 2400/20
See application file for complete search history.

(56) References Cited

U.S. PATENT DOCUMENTS

| | | | |
|---|---|---|---|
| 2004/0105264 A1* | 6/2004 | Spero | H05B 47/172 |
| | | | 362/276 |
| 2006/0044818 A1* | 3/2006 | Amagasa | B60Q 1/28 |
| | | | 362/514 |
| 2006/0285341 A1* | 12/2006 | Yatsuda | F21S 41/125 |
| | | | 257/E33.072 |

(Continued)

FOREIGN PATENT DOCUMENTS

| | | | | |
|---|---|---|---|---|
| CN | 108601171 A | * | 9/2018 | ............. B60Q 1/085 |
| CN | 111365679 A | * | 7/2020 | ............... B60Q 1/04 |

(Continued)

OTHER PUBLICATIONS

International Search Report and Written Opinion mailed on Jun. 29, 2021, received for PCT Application PCT/JP2021/018063, filed on May 12, 2021, 8 pages including English Translation.

*Primary Examiner* — Adam D Houston
(74) *Attorney, Agent, or Firm* — XSENSUS LLP (57) ABSTRACT

A headlight device is a headlight device for a vehicle, including a light source unit to include a plurality of light-emitting units respectively emitting light having spectral distributions different from each other and to emit illuminating light having a combined spectral distribution as a combination of the spectral distributions of the plurality of light-emitting units, an acquisition unit to acquire environment information indicating a surrounding environment around an illumination region formed by the headlight device, and a control unit to control the spectral distributions of the plurality of light-emitting units based on the environment information acquired by the acquisition unit.

9 Claims, 9 Drawing Sheets

(56) References Cited

U.S. PATENT DOCUMENTS

| | | | | |
|---|---|---|---|---|
| 2012/0206050 | A1* | 8/2012 | Spero | F21S 4/28 |
| | | | | 315/152 |
| 2017/0198877 | A1* | 7/2017 | Suwa | B62J 6/022 |
| 2018/0245763 | A1* | 8/2018 | Oshima | B60Q 1/34 |
| 2018/0255622 | A1* | 9/2018 | Spero | F21V 23/0478 |
| 2019/0204528 | A1* | 7/2019 | Oshima | B60Q 1/04 |
| 2021/0162912 | A1* | 6/2021 | Spero | F21S 41/153 |
| 2021/0263301 | A1* | 8/2021 | Oshima | G03B 21/147 |
| 2024/0239260 | A1* | 7/2024 | Suwa | B60Q 1/143 |

FOREIGN PATENT DOCUMENTS

| | | | | | |
|---|---|---|---|---|---|
| CN | 112776706 | A | * | 5/2021 | |
| DE | 19922735 | A1 | * | 12/1999 | B60Q 1/085 |
| DE | 102017120748 | A1 | * | 3/2018 | B60Q 1/06 |
| DE | 112021007652 | T5 | * | 3/2024 | B60Q 1/04 |
| EP | 2648219 | A2 | * | 10/2013 | B60Q 1/04 |
| JP | 2006-069382 | A | | 3/2006 | |
| JP | 2006-351369 | A | | 12/2006 | |
| JP | 2007-106341 | A | | 4/2007 | |
| JP | 2020-032803 | A | | 3/2020 | |
| JP | 7170950 | B1 | * | 11/2022 | B60Q 1/04 |
| KR | 200165992 | Y1 | * | 2/2000 | |
| KR | 20250045372 | A | * | 4/2025 | |
| WO | WO-2013111134 | A1 | * | 8/2013 | A01K 1/00 |
| WO | WO-2016093119 | A1 | * | 6/2016 | F21S 41/12 |
| WO | WO-2021052661 | A1 | * | 3/2021 | |

* cited by examiner

HEADLIGHT DEVICE

CROSS-REFERENCE TO RELATED APPLICATION

This application is based on PCT filing PCT/JP2021/018063, filed May 12, 2021, the entire contents of which are incorporated herein by reference.

TECHNICAL FIELD

The present disclosure relates to a headlight device for a vehicle.

BACKGROUND ART

As a light source of a headlight device for a vehicle, configurations employing a light-emitting diode (hereinafter referred to as an "LED (Light Emitting Diode)") widespread in recent years are increasing. For example, when white light is emitted from the headlight device, the white light is generated by a combination of a blue color LED and a yellow color fluorescent body. Accordingly, the white light is generated with high efficiency by using an inexpensive configuration.

The configuration for generating the white light is not limited to the combination of the blue color LED and the yellow color fluorescent body; other configurations have also been known. See Patent Reference 1, for example. Further, in regard to headlight devices for vehicles, there has also been known a technology of increasing the visibility of the driver by controlling a spectral distribution of light of another color different from the white light.

The headlight device in the Patent Reference 1 includes a first LED unit formed by covering the blue color LED with a fluorescent body and a second LED unit formed by combining LEDs of three colors (red color, green color and blue color). Further, the headlight device in the Patent Reference 1 includes a control unit that controls at least one of luminance and color temperature of each of the first LED unit and the second LED unit depending on environment around illumination environment of the headlight device.

Here, it has generally been known that the Purkinje phenomenon, as the shifting of the human eye's brightness sensitivity towards a short-wavelength side, occurs as a visual property of the human in a mesopic vision environment or a scotopic vision environment such as a road in the nighttime. Therefore, it is possible to let a person (i.e., driver) sense high brightness by setting the spectral distribution of illuminating light applied to the road in the nighttime to contain a lot of short-wavelength components. In the headlight device in the Patent Reference 1, each of the first and second LED units is equipped with a blue color LED, and thus the generated white light contains a lot of short-wavelength blue color components.

PRIOR ART REFERENCE

Patent Reference

Patent Reference 1: Japanese Patent Application Publication No, 2020-32803

SUMMARY OF THE INVENTION

Problem to be Solved by the Invention

However, with the configuration in which the white light emitted from the headlight device contains a lot of short-wavelength blue color components, at times of bad weather such as rain or fog, the white light is scattered or the like by raindrops or the like and enters the driver's eyes as returning light. When there is a lot of returning light, the returning light can give dazzlement (hereinafter referred to also as "glare") to the driver and deteriorate the visibility.

An object of the present disclosure is to provide a headlight device that improves the visibility of the driver.

Means for Solving the Problem

A headlight device according to an aspect of the present disclosure is a headlight device for a vehicle, including a light source unit that includes a light source unit to include a plurality of light-emitting units respectively emitting light having spectral distributions different from each other and to emit illuminating light having a combined spectral distribution as a combination of the spectral distributions of the plurality of light-emitting units; and processing circuitry to acquire environment information indicating a surrounding environment around an illumination region formed by the headlight device; and to control the spectral distributions of the plurality of light-emitting units based on the acquired environment information, wherein the plurality of light-emitting units include a first light-emitting unit to emit first light, and a second light-emitting unit to emit second light whose central wavelength is shorter than a central wavelength of the first light, and the processing circuitry calculates a glare amount for evaluating glare given to a driver of the vehicle when the illuminating light is emitted, based on the environment information, and weakens the intensity of the second light when the glare amount is judged to be greater than or equal to a predetermined glare threshold value.

Effect of the Invention

According to the present disclosure, a headlight device that improves the visibility of the driver can be provided.

MODE FOR CARRYING OUT THE INVENTION

A headlight device according to an embodiment of the present disclosure will be described below with reference to the drawings. In the drawings, coordinate axes of an XYZ orthogonal coordinate system are shown as needed in order to facilitate the understanding of the description. An X-axis is a coordinate axis parallel to a left-right direction of a vehicle. When facing a forward direction of the vehicle, a rightward direction is a +X-axis direction, and a leftward direction is a −X-axis direction. Here, the "forward direction" means a traveling direction of the vehicle. In other words, the "forward direction" is a direction in which the headlight device emits light (hereinafter referred to also as "illuminating light L1"). A Y-axis is a coordinate axis parallel to an upward/downward direction of the vehicle. An upward direction of the vehicle is a +Y-axis direction, and a downward direction of the vehicle is a −Y-axis direction. That is, a +Y-axis side of the vehicle is the sky's side, and a −Y-axis side of the vehicle is the ground's side (i.e., the road surface's side). A +Z-axis direction is the traveling direction of the vehicle, and a −Z-axis direction is a direction opposite to the traveling direction. In the following description, the "+Z-axis direction" is referred to as the "forward direction", and the −Z-axis direction is referred to as a "backward direction" The +Z-axis direction is the direction in which the headlight device emits light.

In the following description, a Z-X plane is a surface parallel to the road surface. This is because the road surface when considered normally is a "horizontal surface". Thus, the Z-X plane is regarded as the "horizontal surface". The "horizontal surface" is a plane orthogonal to the gravity direction. However, there are cases where the road surface is inclined with respect to the traveling direction of the vehicle. These cases are cases where the road surface is an upward slope, a downward slope or the like. In these cases, the "horizontal surface" is regarded as a surface parallel to the road surface. That is, the "horizontal surface" is not a plane orthogonal to the gravity direction.

On the other hand, it is rare that an ordinary road surface is inclined in the left-right direction with respect to the traveling direction of the vehicle. The "left-right direction" is a width direction of a lane (i.e., the road surface). In such cases, the "horizontal surface" is regarded as a surface orthogonal to the gravity direction. For example, even when the vehicle is orthogonal to the left-right direction of the road surface due to an inclination of the road surface in the left-right direction, the condition is considered to be equivalent to a condition in which the vehicle is inclined in the left-right direction with respect to the "horizontal surface".

To simplify the following description, the description will be given while regarding the "horizontal surface" as a plane orthogonal to the gravity direction. That is, the description will be given while regarding the Z-X plane as a plane orthogonal to the gravity direction.

As the light source (hereinafter referred to also as a "light-emitting unit") in the present disclosure, a tube/bulb light source such as an incandescent lamp, a halogen lamp or a fluorescent lamp may be used, for example. Further, as the light source in the present disclosure, a semiconductor light source such as an LED or a laser diode may be used, for example. That is, the light source in the present disclosure is not particularly limited and any type of light source may be used.

However, from the viewpoint of easiness of adjustment of the spectral distribution of the light emitted from the light source, it is desirable to employ a semiconductor light source as the light source of the headlight device in the present disclosure. When the semiconductor light source is employed, the adjustment of the spectral distribution is easier compared to cases where the conventional halogen lamp (lamp light source) is employed.

Therefore, the following description in the present disclosure will be given on the assumption that the light source is an LED as a type of the semiconductor light source.

The present disclosure is applied to the low beam, the high beam, etc. of the headlight device. Further, the present disclosure is applied to the low beam, the high beam, etc. of the headlight device for a motorcycle. Furthermore, the present disclosure is applied also to other headlight devices for three-wheeled vehicles, four-wheeled vehicle's and the like.

Configuration of Headlight Device

Figure 1:
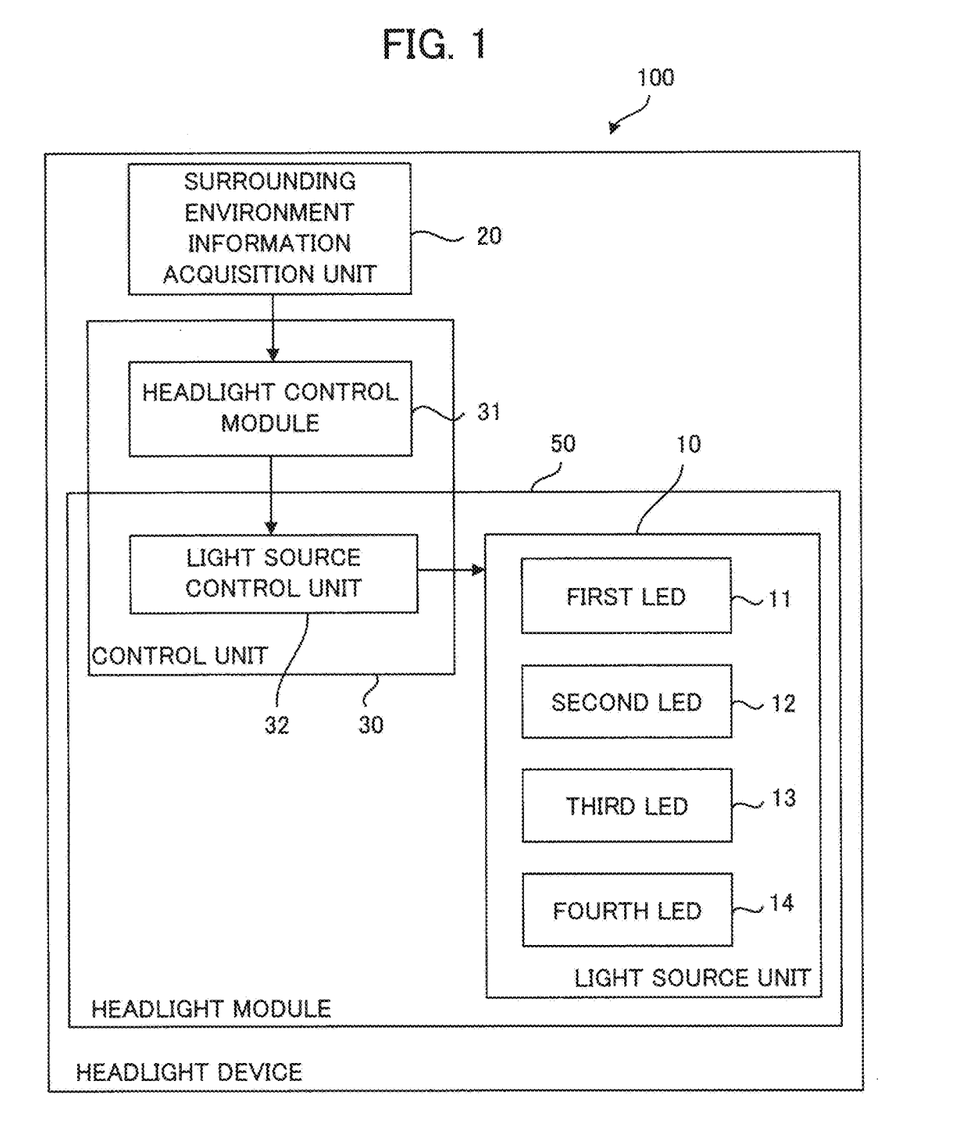
FIG. 1 is a block diagram showing the configuration of a headlight device according to an embodiment.

FIG. 1 is a block diagram showing the configuration of a headlight device 100 according to the embodiment. As shown in FIG. 1, the headlight device 100 includes a light source unit 10 as a headlight optical system, a surrounding environment information acquisition unit 20 as an acquisition unit, and a control unit 30.

Light Source Unit

The light source unit 10 includes first, second, third and fourth LEDs 11, 12, 13 and 14 as a plurality of light-emitting units. The first, second, third and fourth LEDS 11, 12, 13 and 14 respectively emit light having spectral distributions different from each other. As above, the light source unit 10 has two or more light-emitting surfaces emitting light having spectral distributions different from each other.

The light source unit 10 emits illuminating light having a combined spectral distribution (e.g., combined spectral distributions S1, S2 shown in FIGS. 8 and 9 which will be explained later) as a combination of the spectral distributions of the first, second, third and fourth LEDs 11, 12, 13 and 14. The light source unit 10 emits white light as the illuminating light, for example. The output power of each of the first, second, third and fourth LEDs 11, 12, 13 and 14 is controlled by the control unit 30 which will be described later, by which the light source unit 10 is enabled to generate the white light that is considered to have the same color temperature and the same chromaticity before and after the control.

Figure 2A:
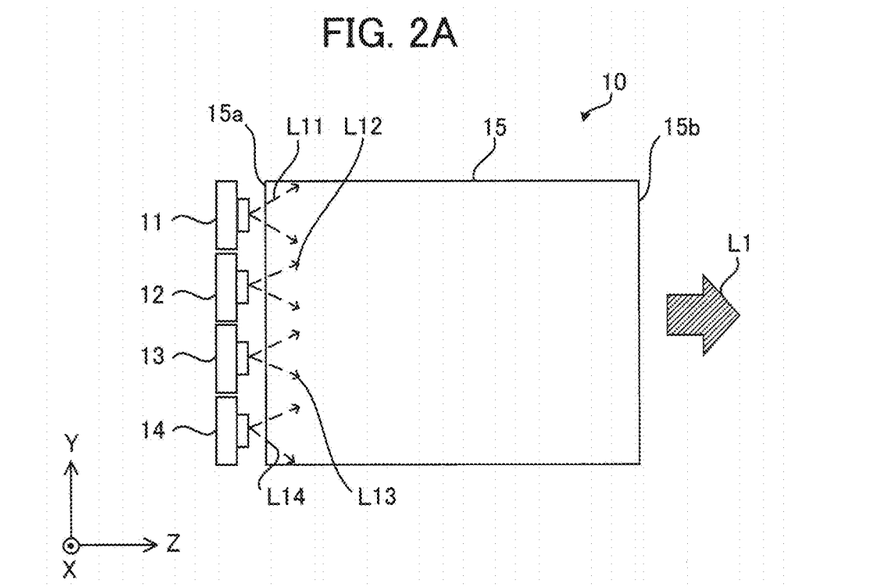
FIG. 2A is a side view showing the configuration of a light source unit shown in FIG. 1.
Figure 2B:
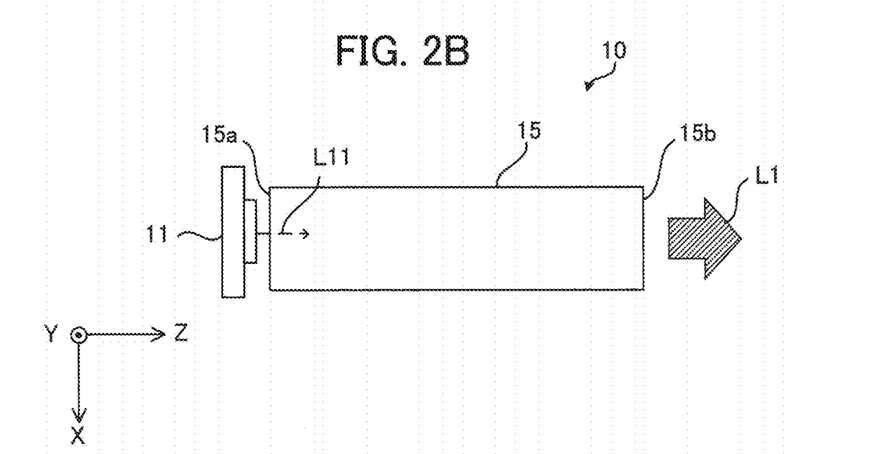
FIG. 2B is a plan view showing the configuration of the light source unit shown in FIG. 1.

FIG. 2A is a side view showing the configuration of the light source unit 10. FIG. 2B is a plan view showing the configuration of the light source unit 10. As shown in FIGS. 2A and 2B, the light unit 10 further includes a light guide member 15. The light guide member 15 uniformly mixes colors of the light respectively emitted from the first, second, third and fourth LEDs 11, 12, 13 and 34.

The light respectively emitted from the first, second, third and fourth LEDs 11, 12, 13 and 14 is incident upon an incidence surface 15$a$ of the light guide member 15 and thereafter repeats undergoing total reflection inside the light guide member 15 and thereby turns into uniform white light. The white light is emitted from an emission surface 15$b$. Accordingly, the illuminating light L1 emitted from the headlight device 100 can be emitted in the forward direction as uniform white light with no color irregularity.

Further, since the light source unit 10 includes the light guide member 15, the headlight device 100 can be downsized.

Furthermore, the light guide member 15 is made with transparent resin, glass or silicone material, for example. The material of the light guide member 15 can be any material as long as the material has light permeability, such as transparent resin or the like. However, from the viewpoint of utilization efficiency of light, material with high light permeability is suitable as the material of the light guide member 15. Further, since the light guide member 15 is arranged immediately after the first, second, third and fourth LEDs 11, 12, 13 and 14, a material excelling in heat resistance is desirable as the material of the light guide member 15.

While a configuration in which the light source unit 10 includes four LEDs is illustrated in the example shown in FIG. 1 and FIGS. 2A and 2B, the configuration is not limited to this example as long as the light source unit 10 includes two or more LEDs different from each other in the spectral distribution.

Further, the light source unit 10 can be implemented even without the light guide member 15. The light source unit 10 may generate the white light in the uniform light color by using another optical member different from the light guide member 15, for example.

Surrounding Environment Information Acquisition Unit

Returning to FIG. 1, the surrounding environment information acquisition unit 20 and the control unit 30 will be described below. The surrounding environment information acquisition unit 20 acquires environment information (hereinafter referred to also as "surrounding environment information") indicating a surrounding environment around an illumination region formed by the headlight device 100. The surrounding environment information acquisition unit 20 acquires information for quantitatively evaluating a glare amount representing the level of the glare given to the driver of the vehicle provided with the headlight device 100 when the illuminating light L1 is emitted from the headlight device 100 as the surrounding environment information. The surrounding environment information includes weather information indicating the weather, for example. The weather information includes at least one of rain, snow and fog. The surrounding environment information may include not only the weather information but also brightness information indicating the brightness of the surrounding environment around the illumination region formed by the headlight device 100. Further, the surrounding environment information may include traffic information indicating the volume of traffic of other vehicles. Furthermore, as will be described later, the surrounding environment information may include surrounding environment light information indicating information regarding the returning light as the illuminating light L1 emitted from the headlight device 100 and then reflected or scattered in the illumination region.

As above, the surrounding environment information acquisition unit 20 is an information input unit to which sensor information such as the weather information, the brightness information, the traffic information and the surrounding environment light information is inputted. The surrounding environment information acquisition unit 20 may acquire the sensor information either from a sensor attached to the vehicle or by communicating with an information source outside the vehicle.

Control Unit

The control unit 30 controls the spectral distribution of each of the first, second, third and fourth LEDs 11, 12, 13 and 14 (e.g., spectral distributions S11, S12, S13 and S14 shown in FIG. 7 which will be explained later) based on the surrounding environment information acquired by the surrounding environment information acquisition unit 20. The control unit 30 includes a headlight control module 31 and a light source control unit 32.

The headlight control module 31 calculates the glare amount, evaluating the glare given to the driver when the illuminating light L1 is emitted, based on the surrounding environment information and judges whether or not the calculated glare amount satisfies a predetermined condition. For example, the headlight control module 31 judges whether or not the calculated glare amount is greater than or equal to a predetermined glare threshold value. Based on the result of the judgment, the headlight control module 31 generates a control signal for controlling the output power (i.e., intensity) of light L11, L12, L13, L14 emitted from each of the first, second, third and fourth LEDs 11, 12, 13 and 14. The headlight control module 31 outputs the generated control signal to the light source control unit 32. As above, the headlight control module 31 is a control signal generation unit that generates the control signal.

The light source control unit 32 is a light source drive unit that drives the light source unit 10. The light source control unit 32 drives each of the first, second, third and fourth LEDs 11, 12, 13 and 14 based on the control signal generated by the headlight control module 31. In the example shown in FIG. 1, the light source control unit 32 and the light source unit 10 are included in a headlight module 50 of the headlight device 100.

Figure 3A:
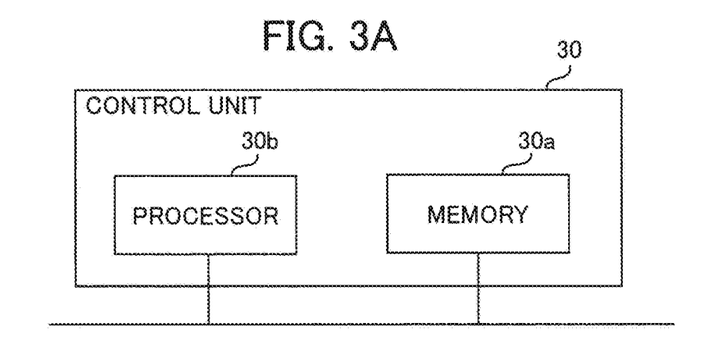
FIG. 3A is a diagram schematically showing an example of the hardware configuration of a control unit of the headlight device according to the embodiment.

FIG. 3A is a diagram schematically showing the hardware configuration of the control unit 30. As shown in FIG. 3A, the control unit 30 can be implemented by using a memory 30$a$ as a storage device that stores a program as software and a processor 30$b$ as an information processing unit that executes the program stored in the memory 30$a$ (e.g., by a computer), for example. Further, part of the control unit 30, namely, part of the headlight control module 31 and the light source control unit 32, may be implemented by the memory 30$a$ shown in FIG. 3A and the processor 30$b$ executing a program. Further, the control unit 30 may also be implemented by an electric circuit.

Figure 3B:
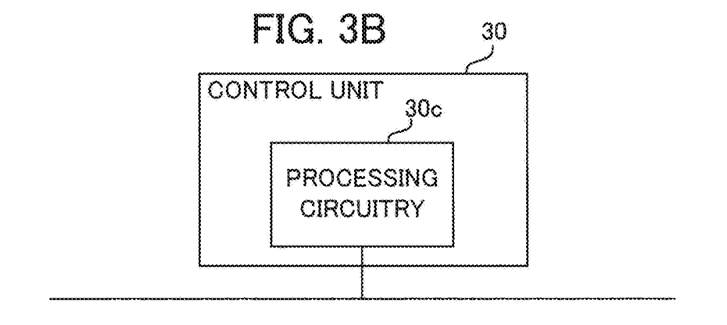
FIG. 3B is a diagram schematically showing another example of the hardware configuration of the control unit of the headlight device according to the embodiment.

FIG. 3B is a diagram schematically showing another example of the hardware configuration of the control unit 30. As shown in FIG. 3B, the control unit 30 may also be implemented by using processing circuitry 30$c$ as dedicated hardware such as a single circuit or a combined circuit. In this case, the functions of the control unit 30 are implemented by the processing circuitry 30$c$.

Relationship Between Purkinje Phenomenon and Glare

Here, the Purkinje phenomenon is known as a factor of giving the glare to the driver of the vehicle provided with the headlight device. The Purkinje phenomenon is a phenomenon in which the peak of a relative luminous efficiency curve shifts towards the short-wavelength side in a scotopic vision environment relative to the peak in a photopic vision environment.

Figure 4:
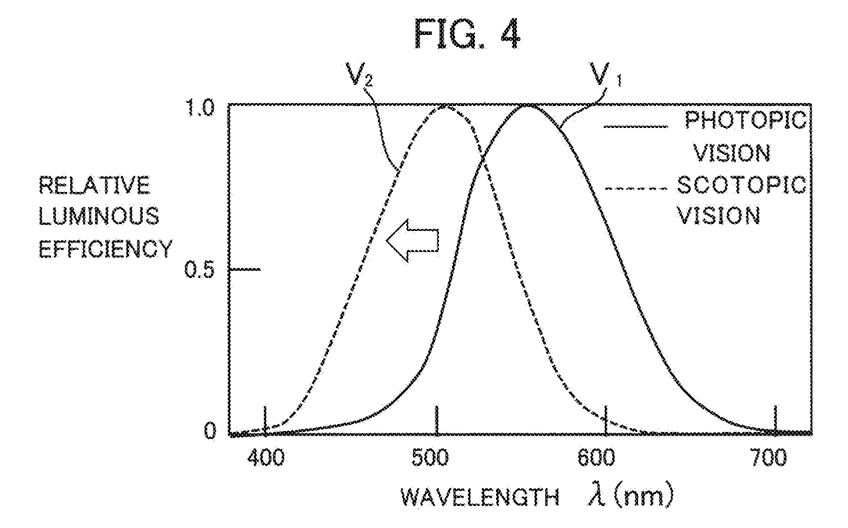
FIG. 4 is a graph showing a relative luminous efficiency curve in a photopic vision environment and a relative luminous efficiency curve in a scotopic vision environment.

FIG. 4 is a graph showing a relative luminous efficiency curve $V_1$ in a photopic vision environment and a relative luminous efficiency curve $V_2$ in a scotopic vision environment. In the graph shown in FIG. 4, the horizontal axis represents the wavelength λ (nm), and the vertical axis represents the relative luminous efficiency. Further, in FIG. 4, the solid line represents the relative luminous efficiency curve $V_1$ in the photopic vision environment, and the broken line represents the relative luminous efficiency curve $V_2$ in the scotopic vision environment. As shown in FIG. 4, the wavelength at the peak of the relative luminous efficiency curve $V_2$ has shifted towards the short-wavelength side (i.e., in the direction of the arrow shown in FIG. 4) relative to the wavelength at the peak of the relative luminous efficiency curve $V_1$. For example, in the photopic vision environment in which the surrounding environment is bright like the environment in the daytime, the human eye senses light at the wavelength of approximately 555 nm to be the brightest. In contrast, in the scotopic vision environment, the human eye senses light at the wavelength of approximately 507 nm to be the brightest. Here, the illumination environment formed by the headlight device in the nighttime is a brightness environment called a "mesopic vision environment" between the photopic vision environment and the scotopic vision environment.

Figure 5:
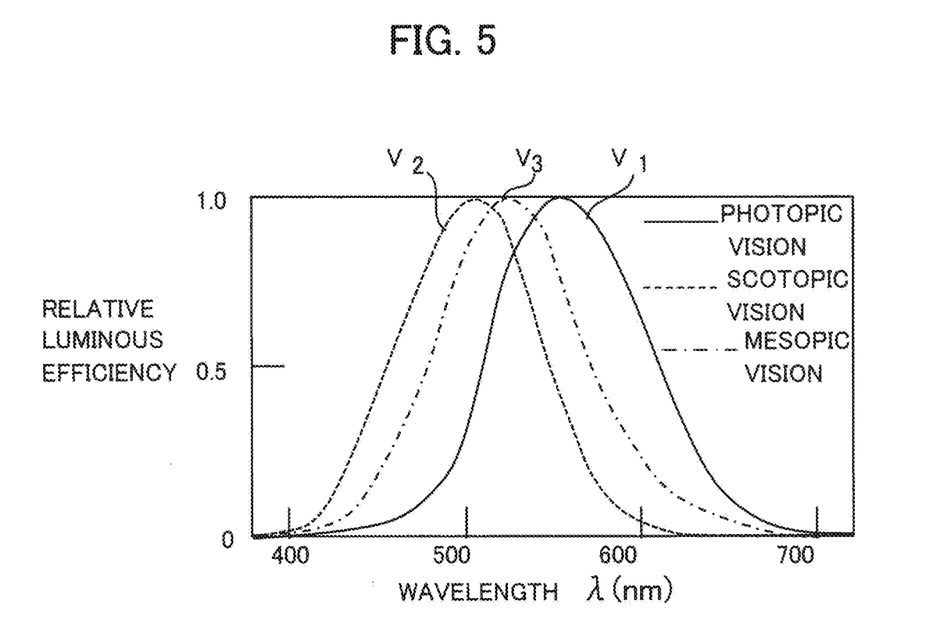
FIG. 5 is a graph obtained by adding a relative luminous efficiency curve in a mesopic vision environment to the graph shown in FIG. 4.

FIG. 5 is a graph obtained by adding a relative luminous efficiency curve $V_3$ in the mesopic vision environment to the graph shown in FIG. 4. As shown in FIG. 5, the wavelength at the peak of the relative luminous efficiency curve $V_3$ is between 507 nm and 555 nm. Therefore, when illuminating light at a wavelength between 507 nm and 555 nm is emitted from the headlight device, the driver's eyes can sense the illuminating light to be the brightest. On the other hand, when the light amount of the illuminating light at the wavelength between 507 nm and 555 nm increases more than necessary, the driver becomes likely to feel the glare.

For example, when the illuminating light is emitted from the headlight device at times of bad weather such as rain or snow, the illuminating light can be scattered by raindrops or snow and enter the driver's eyes as the returning light. In this case, the driver feels the glare. Further, as mentioned earlier, the driver feels the glare more intensely with the increase in the short-wavelength components shorter than or equal to the wavelength of 555 nm contained in the illuminating light.

Operation of Headlight Device

Figure 6:
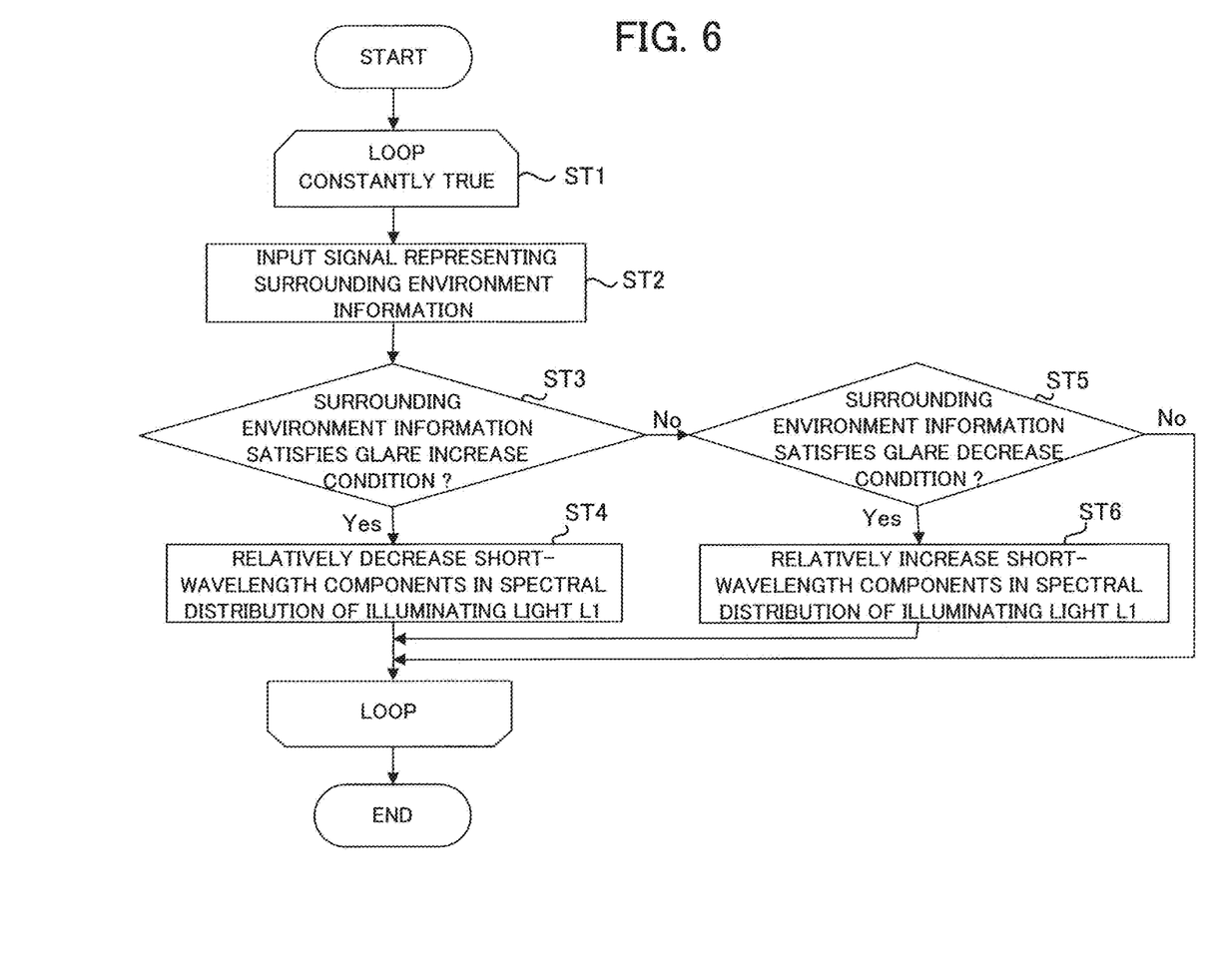
FIG. 6 is a flowchart showing the operation of the headlight device according to the embodiment.
Figure 7A:
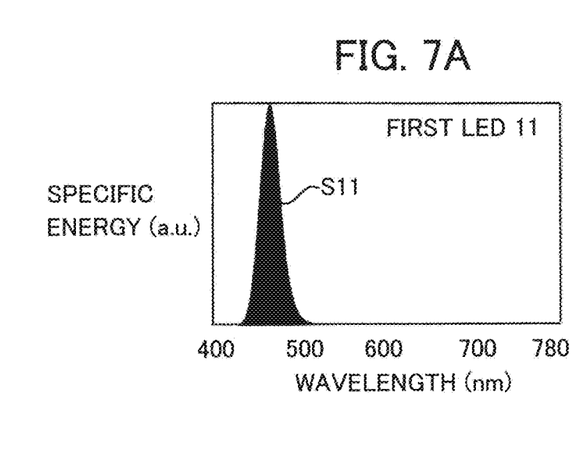
FIGS. 7A to 7D are graphs showing spectral distributions of light respectively emitted from a plurality of LEDs shown in FIG. 1 and FIG. 2A.
Figure 7B:
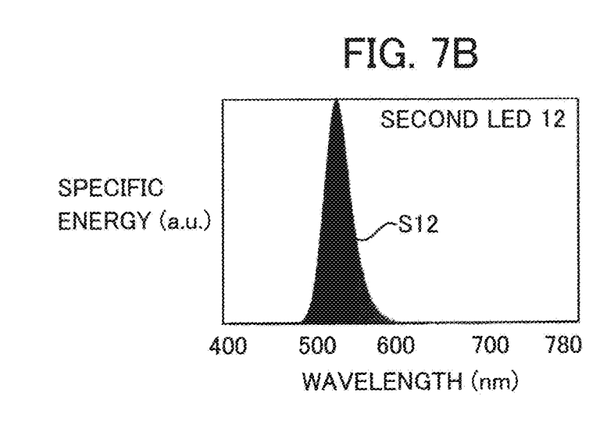
Figure 7C:
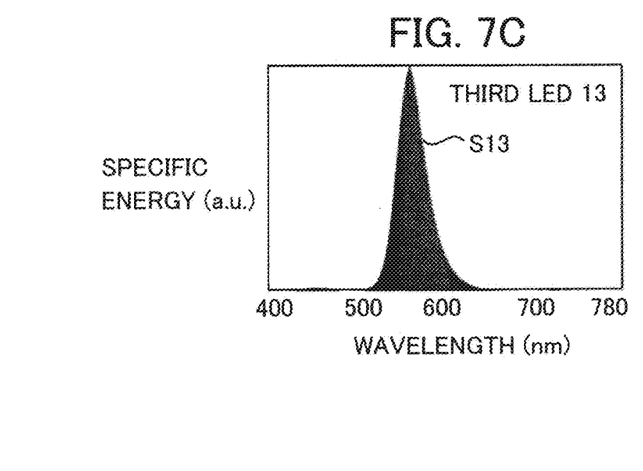
Figure 7D:
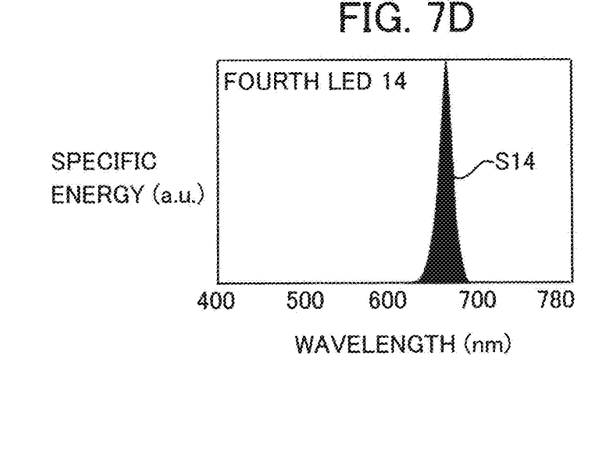

In the headlight device 100 according to the embodiment, the spectral distribution of the illuminating light L1 emitted from the light source unit 10 is adjusted based on the surrounding environment information acquired by the surrounding environment information acquisition unit 20, by which the glare given to the driver can be inhibited. FIG. 6 is a flowchart showing the operation of the headlight device 100.

First, in step ST1, the control unit 30 after startup starts a loop process of repeating processing of steps ST2 to ST6.

In the step ST2, a signal representing the surrounding environment information acquired by the surrounding environment information acquisition unit 20 is inputted to the headlight control module 31 of the control unit 30.

In step ST3, the headlight control module 31 judges whether or not the surrounding environment information satisfies a condition for increasing the glare given to the driver (hereinafter referred to also as a "glare increase condition"), and when the surrounding environment information satisfies the glare increase condition (i.e., when the judgment is Yes in the step ST3), advances the process to step ST4. For example, the headlight control module 31 advances the process to the step ST4 when the weather is rain, snow or fog.

In contrast, when the surrounding environment information is judged not to satisfy the glare increase condition (i.e., when the judgment is No in the step ST3), the headlight control module 31 advances the process to step ST5.

In the step ST4, the headlight control module 31 generates a control signal for relatively decreasing the short-wavelength components as components at wavelengths shorter than a wavelength at a representative point in the spectral distribution of the illuminating light L1. Based on the control signal, the light source control unit 32 shown in FIG. 1 weakens the intensity of light having a short central wavelength among the light L11, L12, L13 and L14 respectively emitted from the first, second, third and fourth LEDs 11, 12, 13 and 14. By this, the glare given to the driver is inhibited. Accordingly, the headlight device 100 is capable of improving the visibility of the driver.

In the step ST5, the headlight control module 31 judges whether or not the surrounding environment information satisfies a condition for decreasing the glare given to the driver (hereinafter referred to also as a "glare decrease condition"), and when the surrounding environment information satisfies the glare decrease condition (i.e., when the judgment is Yes in the step ST5), advances the process to the step ST6.

In the step ST6, the headlight control module 31 generates a control signal for relatively increasing the short-wavelength components in the spectral distribution of the illuminating light L1. Based on the control signal, the light source control unit 32 shown in FIG. 1 strengthens the intensity of light having a short central wavelength among the light L11, L12, L13 and L14 respectively emitted from the first, second, third and fourth LEDs 11, 12, 13 and 14. By this, the illuminating light L1 of the spectral distribution with the increased short-wavelength components is emitted from the headlight device 100 in the mesopic vision environment, and thus the driver can sense the illuminating light L1 to be bright. Accordingly, the headlight device 100 is capable of improving the visibility of the driver.

When the judgment is No in the step ST5 or after finishing the processing of the step ST4 or ST6, the steps ST2 to ST6 are repeated until a condition for ending the loop process is satisfied.

Design Example

Next, a description will be given of a design example of the spectral distribution of the illuminating light L1 in a case of using concrete numerical examples. The following description will be given by taking an example of a case where the central wavelengths (referred to also as "dominant wavelengths") of the first, second, third and fourth LEDs 11, 12, 13 and 14 shown in FIG. 1 and FIG. 2A are at the values shown in Table 1. In the example shown in Table 1, the central wavelengths of the first LED 11 and the second LED 12 are shorter compared to the central wavelengths of the third LED 13 and the fourth LED 14. In the following description, the third and fourth LEDs 13 and 14 are referred to also as "first light-emitting units", and the first and second LEDs 11 and 12 are referred to also as "second light-emitting units". The second light-emitting unit emits light (i.e., the light L11, L12 shown in FIG. 2A) having the central wavelength shorter than the central wavelength of first light (i.e., the light L13, L14 shown in FIG. 2A) emitted from the first light-emitting unit.

TABLE 1

|  | FIRST LED | SECOND LED | THIRD LED | FOURTH LED |
|---|---|---|---|---|
| CENTRAL WAVELENGTH (nm) | 450 | 505 | 535 | 645 |

FIGS. 7A to 7D are graphs showing the spectral distributions S11, S12, S13 and S14 of the light L11, L12, L13 and L14 respectively emitted from the first, second, third and fourth LEDs 11, 12, 13 and 14 shown in FIG. 1 and FIG. 2A. In the graphs shown in FIGS. 7A to 7D, the horizontal axis represents the wavelength λ (nm), and the vertical axis represents specific energy (a.u.). As shown in FIGS. 7A to 7D, each of the spectral distributions S11, S12, S13 and S14 has a peak at the central wavelength shown in Table 1.

Here, a combined spectral distribution as the spectral distribution of the illuminating light L1 before the control is referred to as a combined spectral distribution S1, and a combined spectral distribution as the spectral distribution of the illuminating light L1 after the control is referred to as a combined spectral distribution S2. As described earlier, when the surrounding environment information satisfies the glare increase condition, the headlight control module 31 (see FIG. 1) executes the control so as to relatively decrease the short-wavelength components in the spectral distribution of the illuminating light L1 (e.g., a part where the wavelength is between 450 nm and 550 nm in the spectral distribution). That is, the headlight control module 31 generates the control signal so that the combined spectral distribution S1 and the combined spectral distribution S2 satisfy the following expression (1). In order to satisfy the expression (1), the headlight control module 31 weakens the intensity of second light emitted from the second light-emitting unit (i.e., at least one LED out of the first and second LEDS 11 and 12).

$$\frac{\int_{450}^{550} S1(\lambda)d\lambda}{\int_{400}^{700} S1(\lambda)d\lambda} \geq \frac{\int_{450}^{550} S2(\lambda)d\lambda}{\int_{400}^{700} S2(\lambda)d\lambda}. \quad (1)$$

When the combined spectral distribution S1 and the combined spectral distribution S2 satisfy the expression (1), components whose wavelength is less than or equal to 550 nm decrease in the spectral distribution of the illuminating light L1 emitted from the light source unit 10. That is, the spectral distribution of the illuminating light L1 is inhibited from having a peak at a wavelength less than or equal to 550 nm. Accordingly, the increase in the glare due to the Purkinje phenomenon can be inhibited.

Figure 8:
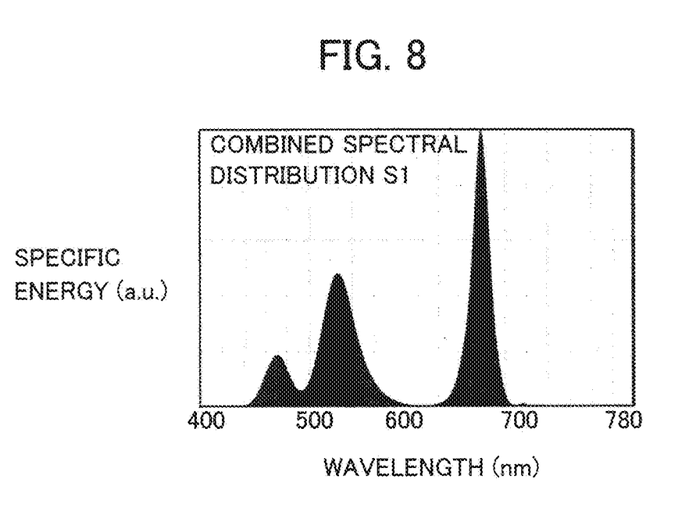
FIG. 8 is a graph showing an example of the spectral distribution of illuminating light before control by the control unit.
Figure 9:
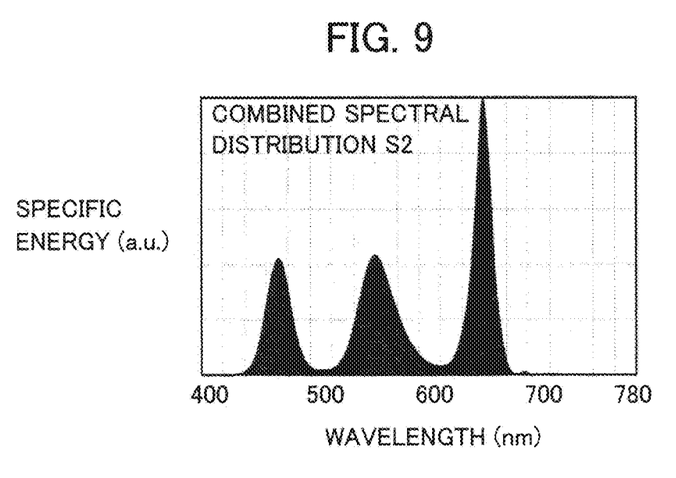
FIG. 9 is a graph showing an example of the spectral distribution of the illuminating light after the control by the control unit.

FIG. 8 is a graph showing an example of the combined spectral distribution S1 of the illuminating light L1 before the control. FIG. 9 is a graph showing an example of the combined spectral distribution S2 of the illuminating light L1 after the control. In the graphs shown in FIGS. 8 and 9, the horizontal axis represents the wavelength λ (nm), and the vertical axis represents the specific energy (a.u.). The combined spectral distribution S1 shown in FIG. 8 is a spectral distribution obtained by controlling the output power of the first LED 11, the second LED 12 and the fourth LED 14 shown in FIG. 1 and FIG. 2A.

The combined spectral distribution S2 shown in FIG. 9 is a spectral distribution obtained by controlling the output power of the first LED 11, the third LED 13 and the fourth LED 14 shown in FIG. 1 and FIG. 2A.

The value on the left side of the expression (1) is 0.467 and the value on the right side of the expression (1) is 0.377. In this case, the expression (1) is satisfied, and thus the glare given to the driver can be inhibited.

In this embodiment, the color of the illuminating Light L1 having the combined spectral distribution S1 and the color of the illuminating light L1 having the combined spectral distribution S2 are the same as each other. In other words, the spectral distributions S11, S12, S13 and S14 are controlled by the control unit 30 so that the color temperature of the illuminating light L1 having the combined spectral distribution S2 takes on a value in a predetermined range. Further, the color of the illuminating light L1 emitted from the headlight device 100 is changed, by which misrecognition of the sense of distance by the driver can be prevented.

In this embodiment, the color of the illuminating light L1 is white color. Here, assuming that the color temperature of the illuminating light L1 having the combined spectral distribution S1 is K1 (unit: K) and the color temperature of the illuminating light L1 having the combined spectral distribution S2 is K2 (unit: K), the color temperature K1 and the color temperature K2 are desired to satisfy the following expression (2):

$$K1 - 500 \leq K2 \leq K1 + 500$$

In the case where the central wavelengths of the first, second, third and fourth LEDs 11, 12, 13 and 14 are at the values shown in Table 1, the color temperature K1 is 5579 K and the color temperature K2 is 5511 K. In this case, the color temperature K1 and the color temperature K2 satisfy the expression (2), and thus the color of the illuminating light L1 having the combined spectral distribution S1 can be regarded as the same color as the color of the illuminating light L1 having the combined spectral distribution S2.

Accordingly, in this embodiment, the color of the illuminating light L1 emitted from the light source unit 10 does not differ before and after the control of the spectral distributions S11, S12, S13 and S14 by the control unit 30, and thus the misrecognition of the sense of distance by the driver can be prevented and the glare can be inhibited. The requirement of not changing the color of the illuminating light L1 emitted from the headlight device 100 is stipulated by laws and regulations.

Effect

According to the embodiment described above, the control unit 30 controls the spectral distributions S11, S12, S13 and S14 of the first, second, third and fourth LEDs 11, 12, 13 and 14 based on the surrounding environment information acquired by the surrounding environment information acquisition unit 20. Thus, the spectral distribution of the illuminating light L1 emitted from the headlight device 100 is adjusted appropriately depending on the surrounding environment information, by which the glare given to the driver can be inhibited. Accordingly, the visibility of the driver can be improved.

Further, according to the embodiment, the control unit 30 controls the spectral distributions S11, S12, S13 and S14 so that the color temperature of the illuminating light L1 takes on a value in the predetermined range before and after the control of the spectral distributions S11, S12, S13 and S14 of the first, second, third and fourth LEDs 11, 12, 13 and 14. Accordingly, the color of the illuminating light L1 emitted from the light source unit 10 does not differ before and after the control of the spectral distributions S11, S12, S13 and S14 by the control unit 30, and thus the misrecognition of the sense of distance by the driver can be prevented.

Modification of Embodiment

Figure 10:
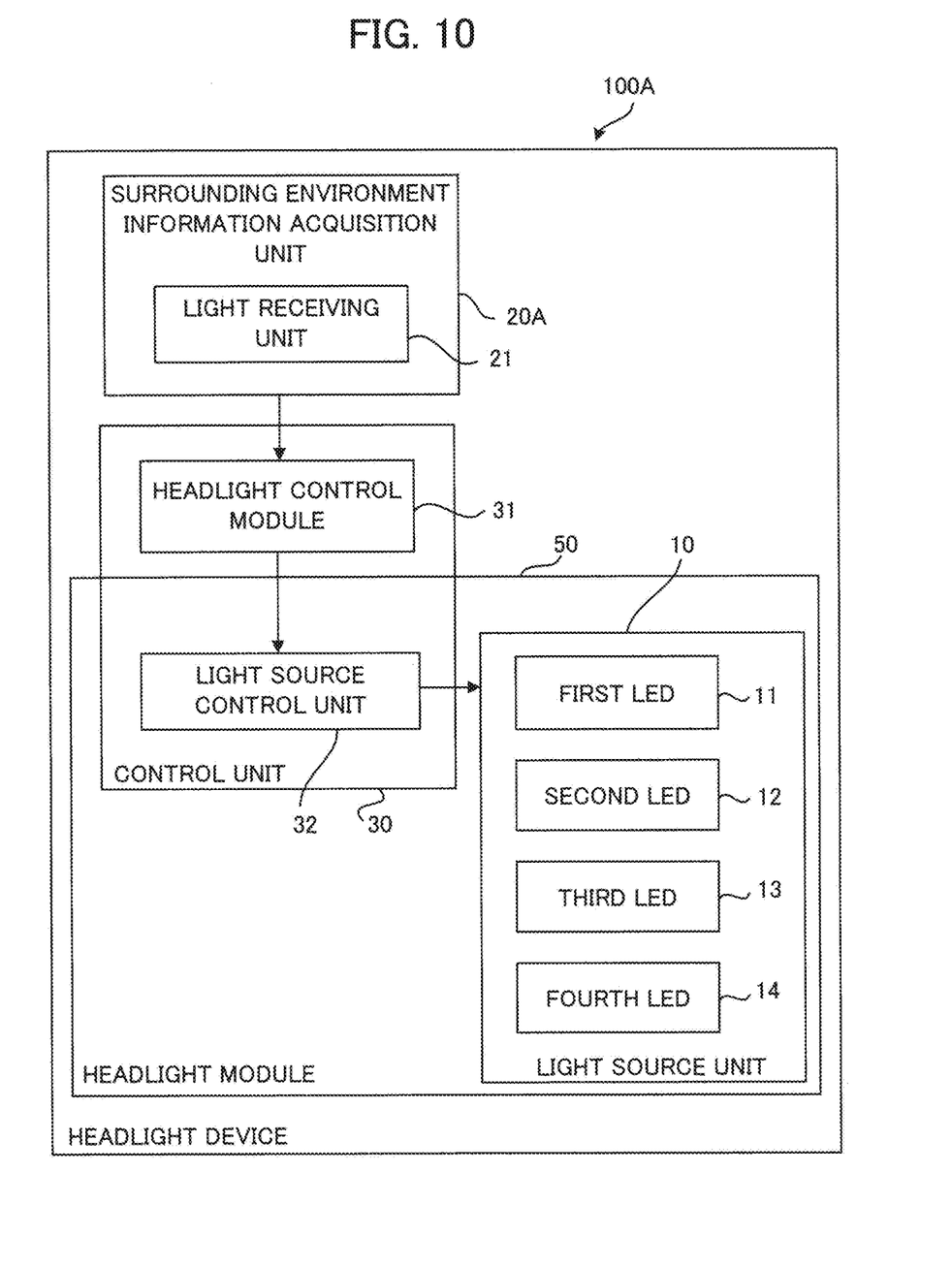
FIG. 10 is a block diagram showing the configuration of a headlight device according to a modification of the embodiment.

FIG. 10 is a block diagram showing the configuration of a headlight device 100A according to a modification of the embodiment. In FIG. 10, each component identical or corresponding to a component shown in FIG. 1 is assigned the same reference character as in FIG. 1. The headlight device 100A according to the modification of the embodiment differs from the headlight device 100 according to the embodiment in that a surrounding environment information acquisition unit 20A includes a light receiving unit 21. Except for this feature, the headlight device 100A according to the modification of the embodiment is the same as the headlight device 100 according to the embodiment Thus, FIG. 2A is referred to in the following description.

As shown in FIG. 10, the headlight device 100A includes the light source unit 10, the surrounding environment information acquisition unit 20A and the control unit 30.

The surrounding environment information acquisition unit 20A includes the light receiving unit 21. The light receiving unit 21 receives the returning light formed when the illuminating light L1 (see FIG. 2A) emitted from the headlight device 100A is reflected or scattered in the illumination region. As above, the returning light is reflected light, scattered light or the like, for example. The returning light is surrounding environment light that occurs in the surrounding environment around the illumination region of the headlight device 100A.

The headlight control module 31 of the control unit 30 generates the control signal to be outputted to the light source control unit 32 based on a detection signal corresponding to the returning light received by the light receiving unit 21.

The detection signal outputted from the light receiving unit 21 is, for example, a signal corresponding to the light reception amount of the returning light detected by the light receiving unit 21. The headlight control module 31 generates the control signal, for decreasing the glare given to the driver when the illuminating light L1 is emitted, based on the signal corresponding to the light reception amount of the returning light, for example. Accordingly, the glare given to the driver when the illuminating light L1 is emitted from the headlight device 100A can be inhibited.

Operation of Headlight Device According to Modification

Figure 11:
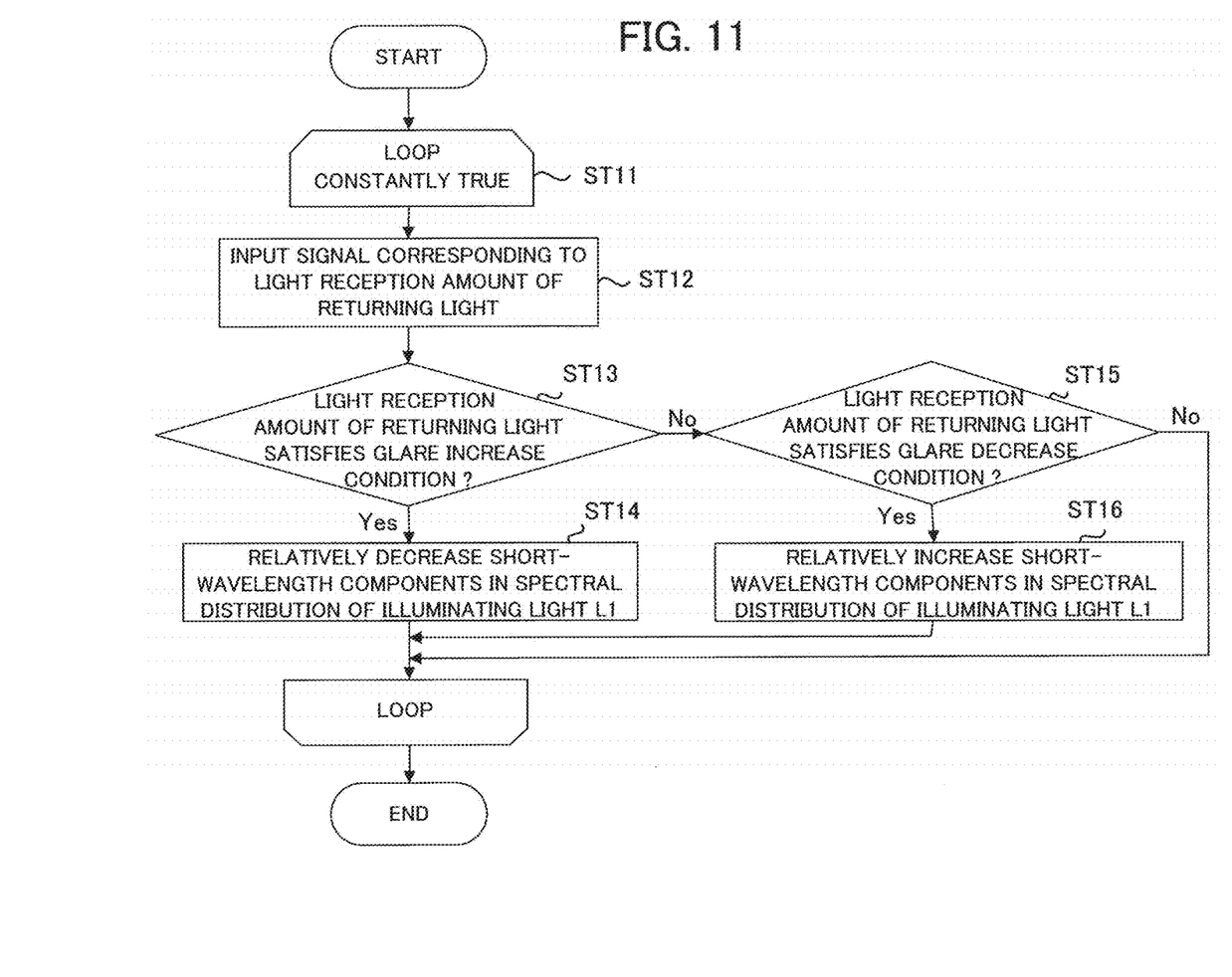
FIG. 11 is a flowchart showing the operation of the headlight device according to the modification of the embodiment.

Next, the operation of the headlight device 100A according to the modification of the embodiment will be described below. FIG. 11 is a flowchart showing the operation of the headlight device 100A according to the modification of the embodiment.

First, in step ST11, the control unit 30 after startup starts a loop process of repeating processing of steps ST12 to ST16.

In the step ST12, the signal corresponding to the light reception amount of the returning light acquired by the surrounding environment information acquisition unit 20A is inputted to the headlight control module 31 of the control unit 30.

In step ST13, the headlight control module 31 judges whether or not the light reception amount of the returning light satisfies the glare increase condition, and when the light reception amount satisfies the glare increase condition (i.e., when the judgment is Yes in the step ST13), advances the process to step ST14. Specifically, in the step ST13, the headlight control module 31 judges whether or not the light reception amount of the returning light is greater than or equal to a predetermined first threshold value Th1, and when the judgment is Yes, advances the process to the step ST14.

In contrast, when the light reception amount of the returning light is judged not to satisfy the glare increase condition (i.e., when the judgment is No in the step ST13 since the light reception amount is less than the first threshold value Th1), the headlight control module 31 advances the process to step ST15.

In the step ST14, the headlight control module 31 executes control of relatively decreasing the short-wavelength components in the spectral distribution of the illuminating light L1 emitted from the light source unit 10. The step ST14 is the same as the step ST4 shown in FIG. 6. For example, the headlight control module 31 generates a control signal for setting a value t shown in the following expression (3) to be less than a predetermined threshold value.

$$t = \frac{\int_{450}^{550} S(\lambda) d\lambda}{\int_{400}^{700} S(\lambda) d\lambda}. \tag{3}$$

In the step ST15, the headlight control module 31 judges whether or not the light reception amount of the returning light satisfies the glare decrease condition, and when the light reception amount satisfies the glare decrease condition (i.e., when the judgment is Yes in the step ST15), advances the process to the step ST16. Specifically, in the step ST15, the headlight control module 31 judges whether or not the light reception amount of the returning light is less than a second threshold value Th2 that is less than the first threshold value Th1, and when the judgment is Yes, advances the process to the step ST16.

The step ST16 is the same as the step ST6 shown in FIG. 6. For example, the headlight control module 31 generates a control signal for setting the value t shown in the aforementioned expression (3) to be greater than the threshold value.

When the judgment is No in the step ST15 or after finishing the processing of the step ST14 or ST16, the steps ST12 to ST16 are repeated until a condition for ending the loop process is satisfied.

Effect of Modification

According to the above-described modification of the embodiment, the surrounding environment information acquisition unit 20A includes the light receiving unit 21 that receives the returning light as the light formed by reflection or scattering of the illuminating light L1 in the illumination region, and when the light reception amount of the returning light is judged to be greater than or equal to the predetermined first threshold value Th1, the headlight device executes the control of weakening the intensity of the light emitted from the second light-emitting unit whose central wavelength is short (e.g., the second LED 12). By this, the illuminating light L1 having an appropriate spectral distribution according to the light reception amount of the returning light is emitted. Accordingly, the glare given to the driver is inhibited, and thus the headlight device 100A is capable of improving the visibility of the driver.

Incidentally, terms indicating a positional relationship between components of the shape of a component, such as "parallel" and "orthogonal", may have been used in the embodiment described above. These terms are intended to include a range allowing for tolerances in the manufacture, variations in the assembly, or the like. Therefore, when a description indicating a positional relationship between components or the shape of a component is included in the claims, such a description is intended to include a range allowing for tolerances in the manufacture, variations in the assembly, or the like.

The embodiment described above is just an example and a variety of modifications are possible within the scope of the present disclosure.

DESCRIPTION OF REFERENCE CHARACTERS

10: light source unit, 11: first LED, 12: second LED, 13: third LED, 14: fourth LED, 15: light guide member, 20, 20A: surrounding environment information acquisition unit, 21: light receiving unit, 30: control unit, 30a: memory, 30b: processor, 30c: processing circuitry, 31: headlight control module, 32: light source control unit, 50: headlight module, 100, 100A: headlight device, L1: illuminating light, L11, L12, L13, L14: light, S1, S2: combined spectral distribution, S11, S12, S13, S14: spectral distribution, Th1: first threshold value, Th2: second threshold value.

What is claimed is:

1. A headlight device for a vehicle, comprising:
a light source unit to include a plurality of light-emitting units respectively emitting light having spectral distributions different from each other and to emit illuminating light having a combined spectral distribution as a combination of the spectral distributions of the plurality of light-emitting units; and
processing circuitry
to acquire environment information indicating a surrounding environment around an illumination region formed by the headlight device; and
to control the spectral distributions of the plurality of light-emitting units based on the acquired environment information, wherein
the plurality of light-emitting units include
a first light-emitting unit to emit first light, and
a second light-emitting unit to emit second light whose central wavelength is shorter than a central wavelength of the first light, and
the processing circuitry
calculates a glare amount for evaluating glare given to a driver of the vehicle when the illuminating light is emitted, based on the environment information, and
weakens the intensity of the second light when the glare amount is judged to be greater than or equal to a predetermined glare threshold value.

2. The headlight device according to claim 1, wherein
the processing circuitry includes a light receiving unit to receive returning light as light formed by reflection or scattering of the illuminating light in the illumination region, and
the processing circuitry weakens the intensity of the second light when a light reception amount of the returning light as the glare amount is judged to be greater than or equal to a predetermined first threshold value.

3. The headlight device according to claim 1, wherein the processing circuitry strengthens the intensity of the second light when the light reception amount of the returning light is judged to be less than or equal to a second threshold value that is less than the first threshold value.

4. The headlight device according to claim 1, wherein the processing circuitry controls the spectral distributions of the plurality of light-emitting units so that color temperature of the illuminating light takes on a value in a predetermined range before and after the control of the spectral distributions.

5. The headlight device according to claim 1, wherein the environment information includes weather information indicating weather.

6. A headlight device for a vehicle, comprising:
a light source unit to include a plurality of light-emitting units respectively emitting light having spectral distributions different from each other and to emit illuminating light having a combined spectral distribution as a combination of the spectral distributions of the plurality of light-emitting units; and
processing circuitry
to acquire environment information indicating a surrounding environment around an illumination region formed by the headlight device; and
to control the spectral distributions of the plurality of light-emitting units based on the acquired environment information, wherein
the plurality of light-emitting units include
a first light-emitting unit to emit first light, and
a second light-emitting unit to emit second light whose central wavelength is shorter than a central wavelength of the first light, and
the processing circuitry controls the spectral distribution of each of the plurality of light-emitting units so that a relationship between a color temperature K1 of the illuminating light of the combined spectral distribution before the control of the spectral distributions and a color temperature K2 of the illuminating light of the combined spectral distribution after the control of the spectral distributions satisfies a following expression in units of Kelvin $$K1 - 500 \leq K2 \leq K1 + 500.$$

7. A headlight device for a vehicle, comprising:
a light source unit to include a plurality of light-emitting units respectively emitting light having spectral distributions different from each other and to emit illuminating light having a combined spectral distribution as a combination of the spectral distributions of the plurality of light-emitting units;

processing circuitry
to acquire environment information indicating a surrounding environment around an illumination region formed by the headlight device; and
to control the spectral distributions of the plurality of light-emitting units based on the acquired environment information, wherein
the plurality of light-emitting units include
a first light-emitting unit to emit first light, and
a second light-emitting unit to emit second light whose central wavelength is shorter than a central wavelength of the first light, and
the processing circuitry
calculates a glare amount for evaluating glare given to a driver of the vehicle when the illuminating light is emitted, based on the environment information, and
controls the spectral distribution of each of the plurality of light-emitting units so as to relatively decrease an integral value of intensities of components whose wavelengths are between 450 nm and 550 nm in the combined spectral distribution when the glare amount is judged to be greater than or equal to a predetermined glare threshold value.

8. The headlight device according to claim 7, wherein, when the glare amount is judged to be greater than or equal to a predetermined glare threshold value, the processing circuitry controls the spectral distribution so as to reduce a second value more than a first value, the first value being a ratio of an integral value of intensities of components whose wavelengths are between 450 nm and 550 nm in the combined spectral distribution before the control of the spectral distribution relative to an integral value of intensities of components whose wavelengths are between 400 nm and 700 nm in the combined spectral distribution before the control of the spectral distribution, the second value being a ratio of an integral value of intensities of components whose wavelengths are between 450 nm and 550 nm in the combined spectral distribution after the control of the spectral distribution relative to an integral value of intensities of components whose wavelengths are between 400 nm and 700 nm in the combined spectral distribution after the control of the spectral distribution.

9. The headlight device according to claim 7, wherein, when the glare amount is judged to be greater than or equal to a predetermined glare threshold value, the processing circuitry controls the spectral distribution so that a ratio of an integral value of intensities of components whose wavelengths are between 450 nm and 550 nm in the combined spectral distribution relative to an integral value of intensities of components whose wavelengths are between 400 nm and 700 nm in the combined spectral distribution is smaller than a predetermined threshold value.

* * * * *